UNITED STATES PATENT OFFICE.

FRANK A. FAHRENWALD, OF CLEVELAND, OHIO.

PROCESS OF SYNTHESIZING AMMONIA IN THE PRESENCE OF A CATALYTIC ALLOY.

1,388,995. Specification of Letters Patent. Patented Aug. 30, 1921.

No Drawing. Application filed February 25, 1918. Serial No. 218,932.

*To all whom it may concern:*

Be it known that I, FRANK A. FAHRENWALD, a citizen of the United States, residing at Cleveland, in the county of Cuyahoga and State of Ohio, have invented a certain new and useful Improvement in Processes of Synthesizing Ammonia in the Presence of a Catalytic Alloy, of which the following is a full, clear, and exact description.

This invention relates to the art of catalytic chemistry according to which art various substances are produced by the direct combination or interaction of fluid substances which under ordinary conditions react or combine together only slowly or to an inconsiderable degree. Thus it is well known that sulfur dioxid can be caused to combine with additional oxygen and produce sulfur trioxid in the presence of certain catalytic agents, such as platinum-gauze, platinum - wire, spongy - platinum, platinum-black, etc., the platinum meanwhile remaining apparently unchanged; and ammonia can be caused to combine with oxygen and form an oxid of nitrogen in contact at proper temperatures with platinum gauze or other finely divided platinum surface. These reactions, however, are generally slow and their quantitative yield is rather small. There are also numerous other reactions which are theoretically possible but hitherto practically unattainable, upon a commercial scale at least, such, for example, as the direct combination of hydrogen and nitrogen to form ammonia.

The objects of my invention are the provision of a catalytic material and process whereby catalytic reactions may be expedited and their quantitative results increased; whereby other reactions may be successfully performed which have hitherto been unsuccessfully sought; and whereby the catalytic material may itself be cheapened and rendered longer lived.

The essence of my invention consists in the discovery that palladium, when suitably alloyed with other substances possesses peculiar properties and qualities as a catalytic agent. The peculiar behavior of this material in association with hydrogen has long been known and has been frequently described by writers sometimes under the term "occlusion" and at other times under the expressions "adsorption," "alloying," "solution," "combination," etc. However, all attempts to employ this material commercially as a catalytic agent prior to my invention or discovery have met with failure owing to the rapid disintegration of the palladium under working conditions and to its becoming contaminated with some of the initial or resultant products of the reaction.

I have discovered that by combining or alloying palladium with certain other metals its peculiar qualities can be rendered commercially valuable while avoiding the objectionable tendencies heretofore encountered. The metal with which it is combined and the proportion of such metal depends upon the particular reaction in view, and also to a less degree upon consideration of expense. For example, in the oxidation of ammonia by the catalytic method, I find that an alloy of palladium with gold exercises a catalytic action fully as strong and rapid as that exhibited by platinum under the same conditions; and for this purpose I have heretofore used with marked success an alloy consisting substantially of gold 60 atomic per cent. and palladium 40 atomic per cent., (equivalent approximately to gold 73.6, palladium 26.4, by weight) although I do not assert that this is the best possible alloy to use, since many conditions influence the choice. However I do not advise using more than 75 atomic per cent. of palladium in view of its tendency to combine with free hydrogen, and I do not advise using less than about 30 atomic per cent. of palladium because of the slowness of the action of such an alloy. My present preference as a catalytic agent for this reaction, is for an alloy containing between 40 and 60 atomic per cent. of palladium, and the remainder of the alloy a metal or mixture of metals from the "noble metal group" of the periodic table, which, as is well known, comprise, in addition to palladium, ruthenium, osmium, rhodium, iridium, gold, silver, and platinum.

For the alloy of palladium with platinum falls within my invention and operates even better than pure platinum, and apparently slightly better than gold-palladium. However, the increasing scarcity of platinum must be taken into account as well as its mounting price. The alloy of palladium with silver is also usable in this connection, and has certain arguments in its favor, particularly in an oxygen reaction, since the solubility of oxygen in silver is well known.

The remaining metals mentioned are usually found as impurities in commercial platinum, palladium, gold and silver, and may or may not be present.

For the sulfur dioxid oxidation reaction I may likewise use any one of the above mentioned noble metal alloys of palladium, although I recommend most highly that which contains gold. The platinum-palladium alloy does not appear to be sufficiently superior to warrant the increased expense; although the alloy of palladium and osmium offers some peculiar advantages in this connection. In any case I prefer an alloy containing about 40 to 50 atomic per cent. of palladium, the remainder being one or more of the noble metals.

For effecting the direct combination of hydrogen and nitrogen to form ammonia I employ an alloy of palladium with one or more other metals, preferably osmium, although one of the non-noble metals can be used in this reaction owing to the absence of oxidizing influences. Among the possibilities I mention especially those metals from the titanium, vanadium, and iron groups and having an atomic weight between 48 and 60, which show an affinity for nitrogen greater than that of most other metals, and of all the non-noble metals for use in this connection I prefer nickel. I find the hereinbefore described proportions as good as any, and prefer to conduct the reaction at a temperature of about 400° C. and under increased pressure because of the greater stability of the ammonia under such conditions.

The reaction is an exothermic one, the heat produced being more than sufficient to maintain the reaction temperature, and cooling is effected by the usual external radiation means and also by forcing the entering gas over the heated surface and in close association to the treated gases.

The palladium alloy is used in any of the modes heretofore customary with platinum and in similar apparatus, preferably in the form of wire, such as a fine mesh gauze, or ball, although granules and other layer masses can be employed. In all cases, in dealing with gases, I prefer to conduct the reaction under conditions productive of atomic energy, such as heat, and pressure; and under this term I also include such other energizers as light (especially from the violet end of the spectrum) and electric discharge, (particularly the static discharge which is so efficacious in producing ozone and in facilitating the action of oxygen.

Having thus described my invention what I claim is:—

The process of producing ammonia synthetically which consists in subjecting hydrogen and nitrogen, to heat and pressure in the presence of a catalytic screen containing palladium and nickel.

In testimony whereof, I hereunto affix my signature.

FRANK A. FAHRENWALD.